US011870268B2

(12) United States Patent
Okino (10) Patent No.: US 11,870,268 B2
(45) Date of Patent: Jan. 9, 2024

(54) POWER MANAGEMENT SERVER AND POWER MANAGEMENT METHOD (71) Applicant: KYOCERA Corporation, Kyoto (JP)

(72) Inventor: Kenta Okino, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 336 days.

(21) Appl. No.: 16/770,189

(22) PCT Filed: Nov. 26, 2018

(86) PCT No.: PCT/JP2018/043347
§ 371 (c)(1),
(2) Date: Jun. 5, 2020

(87) PCT Pub. No.: WO2019/111741
PCT Pub. Date: Jun. 13, 2019

(65) Prior Publication Data
US 2020/0389028 A1 Dec. 10, 2020

(30) Foreign Application Priority Data

Dec. 8, 2017 (JP) .................. 2017-236460

(51) Int. Cl.
H02J 3/46 (2006.01)
H02J 13/00 (2006.01)
H02J 3/32 (2006.01)
H02J 3/38 (2006.01)
(Continued)

(52) U.S. Cl.
CPC .............. *H02J 3/472* (2020.01); *G05B 15/02* (2013.01); *H02J 3/28* (2013.01); *H02J 3/32* (2013.01); *H02J 3/381* (2013.01); *H02J 13/00* (2013.01); *H02J 13/00002* (2020.01);
(Continued)

(58) Field of Classification Search
CPC ...... H02J 3/472; H02J 3/28; H02J 3/32; H02J 3/381; H02J 13/00; H02J 13/00002; H02J 13/00006; H02J 13/00032; H02J 2203/10; H02J 2300/24; H02J 2300/30; H02J 7/34; H02J 7/35; G05B 19/042; G05B 2219/2639; Y02E 10/56; Y02E 60/00; Y04S 10/14; Y04S 40/12; G06Q 50/06
See application file for complete search history.

(56) References Cited

U.S. PATENT DOCUMENTS 9,972,036 B2 5/2018 Zhang et al.
10,381,832 B2 8/2019 Sato et al.
(Continued)

FOREIGN PATENT DOCUMENTS

EP 3343720 A1 * 7/2018 ............. G06Q 50/06
JP 2000232736 A 8/2000
(Continued)

Primary Examiner — Daniel Cavallari
(74) Attorney, Agent, or Firm — HAUPTMAN HAM, LLP (57) ABSTRACT A power management server comprises a controller configured to select, from a plurality of facilities having storage battery apparatuses, two or more first facilities applying first processing configured to suppress a discharge amount of the storage battery apparatuses. The controller is configured to apply, to the two or more first facilities, a same condition as a suppression condition of the discharge amount of the storage battery apparatuses.

5 Claims, 6 Drawing Sheets (51) Int. Cl.
*H02J 3/28* (2006.01)
*G05B 15/02* (2006.01)
(52) U.S. Cl.
CPC .. *H02J 13/00006* (2020.01); *H02J 13/00032* (2020.01); *G05B 2219/2639* (2013.01); *H02J 2203/10* (2020.01)

(56) References Cited

U.S. PATENT DOCUMENTS

| | | | |
|---|---|---|---|
| 2013/0015713 A1* | 1/2013 | Hagihara | H02J 3/46 307/72 |
| 2015/0207323 A1 | 7/2015 | Baba et al. | |
| 2016/0125339 A1 | 5/2016 | Itaya | |
| 2016/0226261 A1 | 8/2016 | Yano et al. | |
| 2018/0241214 A1 | 8/2018 | Terai et al. | |
| 2018/0248375 A1* | 8/2018 | Eda | H02J 3/003 |

FOREIGN PATENT DOCUMENTS

| | | | |
|---|---|---|---|
| JP | 2002152976 A | 5/2002 | |
| JP | 2015-177623 A | 10/2015 | |
| JP | 2016127734 A | 7/2016 | |
| WO | 2014/207851 A1 | 12/2014 | |
| WO | 2015041010 A1 | 3/2015 | |
| WO | 2016084396 A1 | 6/2016 | |
| WO | 2016199814 A1 | 12/2016 | |
| WO | 2017038720 A1 | 3/2017 | |

\* cited by examiner

POWER MANAGEMENT SERVER AND POWER MANAGEMENT METHOD

RELATED APPLICATIONS

The present application is a National Phase of International Application No. PCT/JP2018/043347, filed Nov. 26, 2018, and claims priority based on Japanese Patent Application No. 2017-236460, filed Dec. 8, 2017.

TECHNICAL FIELD

The present invention relates to a power management server and a power management method.

BACKGROUND ART

In recent years, a technology of suppressing the amount of tidal current from a power grid to a facility has been known in order to maintain a power demand and supply balance of the power grid. A technology of using a storage battery apparatus provided in the facility has also been proposed in order to maintain the power demand and supply balance of the power grid (for example, Patent Literatures 1 and 2).

CITATION LIST

Patent Literature

Patent Literature 1: International Publication No. 2015/041010 A1 Pamphlet
Patent Literature 2: International Publication No. 2016/084396 A1 Pamphlet

SUMMARY OF INVENTION

A power management server according to a first feature comprises a controller configured to select, from a plurality of facilities having storage battery apparatuses, two or more first facilities applying first processing configured to suppress a discharge amount of the storage battery apparatuses. The controller is configured to apply, to the two or more first facilities, a same condition as a suppression condition of the discharge amount of the storage battery apparatuses.

A power management server according to a second feature comprises a controller configured to select, from a plurality of facilities having storage battery apparatuses, a second facility in which a remaining storage amount of the storage battery apparatus is equal to or less than a predetermined threshold before an expiration timing of a control target period. The controller is configured to apply, to the second facility, second processing configured to shift a predetermined timing to a later timing on a time axis, the predetermined timing being a timing when the remaining storage amount of the storage battery apparatus is equal to or less than the predetermined threshold before the expiration timing of the control target period.

A power management method according to a third feature comprises a step A of selecting, from a plurality of facilities having storage battery apparatuses, two or more first facilities applying first processing configured to suppress a discharge amount of the storage battery apparatuses. The step A includes a step of applying to the two or more first facilities, a same condition as a suppression condition of the discharge amount of the storage battery apparatuses.

A power management method according to a forth feature comprises a step B of selecting, from a plurality of facilities having storage battery apparatuses, a second facility in which a remaining storage amount of the storage battery apparatus is equal to or less than a predetermined threshold before an expiration timing of a control target period, and a step C of applying, to the second facility, second processing configured to shift a predetermined timing to a later timing on a time axis, the predetermined timing being a timing when the remaining storage amount of the storage battery apparatus is equal to or less than the predetermined threshold before the expiration timing of the control target period.

DESCRIPTION OF EMBODIMENTS

Hereinafter, embodiments will be described with reference to the drawings. In the following description of the drawings, the same or similar parts are denoted by the same or similar reference numerals.

However, it should be noted that the drawings are schematic and ratios of each dimension may be different from actual dimensions. Therefore, specific dimensions should be determined in consideration of the following description. In addition, it is needless to say that the drawings may include portions having different dimensional relationships or ratios.

Summary of Disclosure

In recent years, in the case of using a storage battery apparatus to maintain a demand and supply balance of a power grid, it is considered to control discharge power of the storage battery apparatus so as to follow demand power of a facility (hereinafter, load-following processing).

However, in the case where there is a need to suppress the power of the entire power grid, the following problems may occur. Specifically, in the facility where the load-following processing is performed, there is a possibility that there is little room for power reduction because baseline power is zero. On the other hand, if the discharge of the storage battery apparatus is simply suppressed in order to secure the baseline power, merits of introducing the storage battery apparatus may be impaired.

Therefore, in the summary of the disclosure, a power management server and a power management method that are made in order to solve the above-described problems and that can appropriately secure room for reducing power will be described.

Embodiment (Power Supply Management System)

A power supply management system according to an embodiment will be described below.

Figure 1:
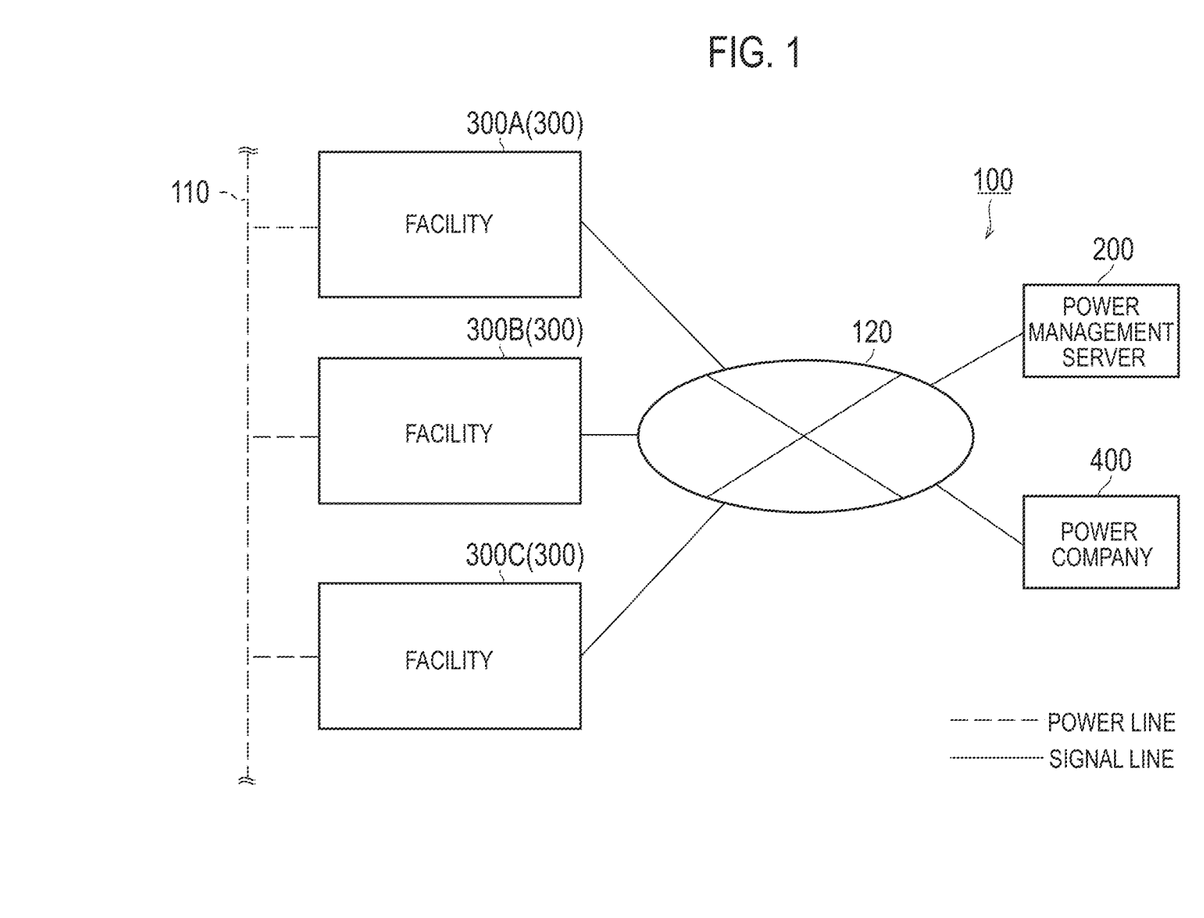
FIG. 1 is a diagram illustrating a power supply management system 100 according to an embodiment.

As illustrated in FIG. 1, a power supply management system 100 includes a power management server 200, a facility 300, and a power company 400. In FIG. 1, the facility 300 exemplifies a facility 300A to a facility 300C.

Each facility 300 is connected to a power grid 110. In the following, a flow of power from the power grid 110 to the facility 300 will be referred to as a tidal current, and the flow of power from the facility 300 to the power grid 110 will be referred to as a reverse tidal current.

The power management server 200, the facility 300, and the power company 400 are connected to a network 120. The network 120 only has to provide a line between the power management server 200 and the facility 300 and a line between the power management server 200 and the power company 400. For example, the network 120 is the Internet. The network 120 may provide a dedicated line such as a virtual private network (VPN).

The power management server 200 is a server managed by a power operator such as a power generation operator, a power distribution operator, a retailer, or a resource aggregator. The resource aggregator is a power operator that provides the reverse tidal current power to the power generation operator, the power distribution operator, the retailer, and the like in a virtual power plant (VPP). The resource aggregator may be a power operator that produces surplus power (negawatt power) by reducing the consumed power of the facility 300 managed by the resource aggregator. Such surplus power may be regarded as generated power. The resource aggregator may be a power operator that maintains the power demand and supply balance of the power grid 110 by suppressing or increasing the consumed power of the facility 300 managed by the resource aggregator (for example, suppressing or increasing the charged power of the storage battery apparatus). In the embodiment, the power management server 200 is an example of an entity of purchasing power of the reverse tidal current power. The power management server 200 is an example of a power supply management server.

The power management server 200 transmits, to a local control apparatus 360 provided in the facility 300, a control message instructing control of a distributed power supply (for example, a solar cell apparatus 310, a storage battery apparatus 320, or a fuel cell apparatus 330) provided in the facility 300. For example, the power management server 200 may transmit a tidal current control message (for example, demand response (DR)) requesting the control of the tidal current, and may transmit the reverse tidal current control message requesting the control of the reverse tidal current. Further, the power management server 200 may transmit a power supply control message that controls an operating state of the distributed power supply. A degree of control of the tidal current or the reverse tidal current may be represented by an absolute value (for example, 00 kW) or a relative value (for example, 00%). Alternatively, the degree of control of the tidal current or the reverse tidal current may be represented by two or more levels. The degree of control of the tidal current or the reverse tidal current may be represented by a power rate (real time pricing (RTP)) defined by the current power demand and supply balance, and a power rate (time of use (TOU)) defined by the past power demand and supply balance.

Figure 2:
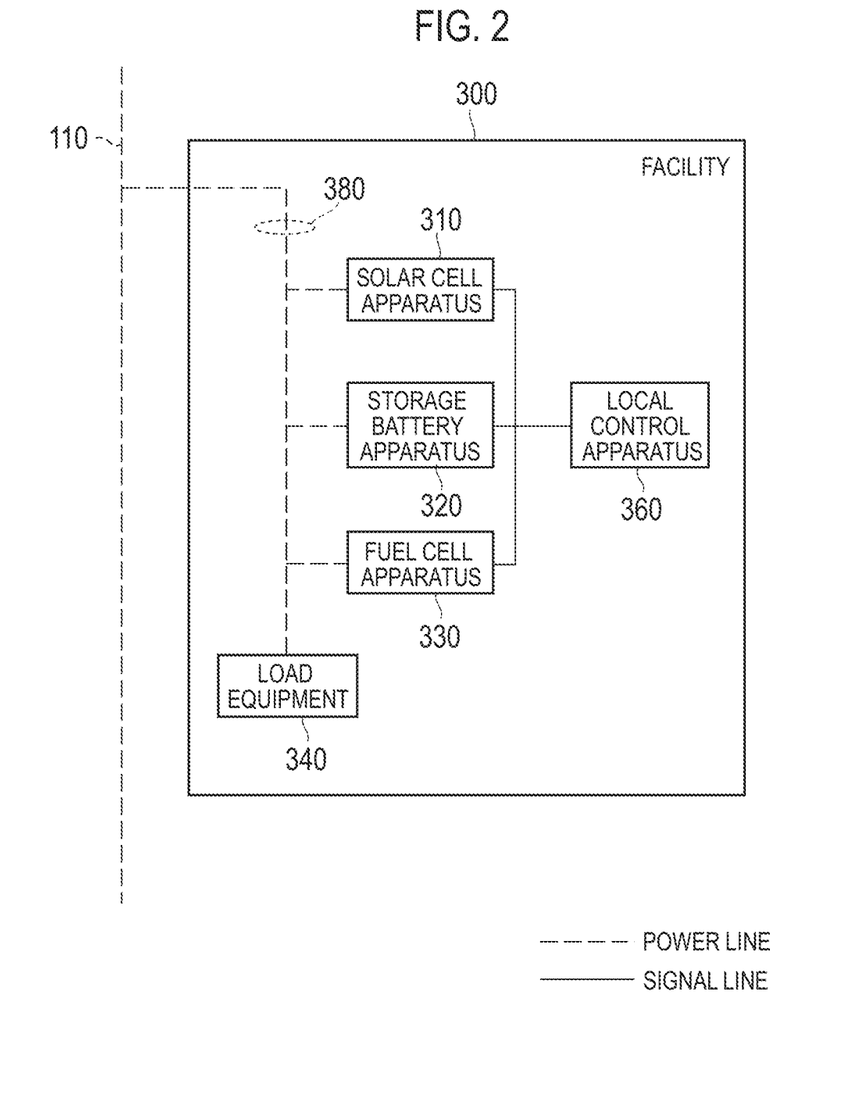
FIG. 2 is a diagram illustrating a facility 300 according to an embodiment.

As illustrated in FIG. 2, the facility 300 includes the solar cell apparatus 310, the storage battery apparatus 320, the fuel cell apparatus 330, a load equipment 340, the local control apparatus 360, and a power meter 380.

The solar cell apparatus 310 is a distributed power supply that generates electricity according to light such as sunlight. The solar cell apparatus 310 is an example of a specific distributed power supply to which a predetermined purchase price is applied. For example, the solar cell apparatus 310 includes a power conditioning system (PCS) and a solar panel.

The storage battery apparatus 320 is a distributed power supply that charges and discharges power. The storage battery apparatus 320 is an example of a distributed power supply to which the predetermined purchase price is not applied. For example, the storage battery apparatus 320 includes a PCS and a storage battery cell.

The fuel cell apparatus 330 is a distributed power supply that generates electricity using fuel. The fuel cell apparatus 330 is an example of a distributed power supply to which the predetermined purchase price is not applied, and is a distributed power supply having a rated operation mode that outputs rated power. For example, the fuel cell apparatus 330 includes the PCS and the fuel cell.

For example, the fuel cell apparatus 330 may be a solid oxide fuel cell (SOFC), a polymer electrolyte fuel cell (PEFC), a phosphoric acid fuel cell (PAFC), or a molten carbonate fuel cell (MCFC).

In the embodiment, the solar cell apparatus 310, the storage battery apparatus 320, and the fuel cell apparatus 330 may be a power supply used for the VPP.

The load equipment 340 is an equipment that consumes power. For example, the load equipment 340 is an air conditioning equipment, a lighting equipment, an audio visual (AV) equipment, or the like.

The local control apparatus 360 is an apparatus (energy management system (EMS)) that manages the power of the facility 300. The local control apparatus 360 may control the operating state of the solar cell apparatus 310, may control the operating state of the storage battery apparatus 320 provided in the facility 300, and may control the operating state of the fuel cell apparatus 330 provided in the facility 300. Details of the local control apparatus 360 will be described later (see FIG. 4).

In the embodiment, communication between the power management server 200 and the local control apparatus 360 is performed according to a first protocol. On the other hand, communication between the local control apparatus 360 and the distributed power supply (solar cell apparatus 310, storage battery apparatus 320, or fuel cell apparatus 330) is performed according to a second protocol different from the first protocol. For example, as the first protocol, a protocol conforming to open automated demand response (Open ADR) or an original dedicated protocol can be used. For example, as the second protocol, a protocol conforming to ECHONET Lite, smart energy profile (SEP) 2.0, KNX, or the original dedicated protocol can be used. Note that the first protocol and the second protocol only have to be different, and for example, both the first protocol and the second protocol only have to be protocols created with different rules even when being the original dedicated protocol.

The power meter 380 is an example of a first power meter that measures the amount of tidal current from the power grid 110 to the facility 300 and the amount of reverse tidal current from the facility 300 to the power grid 110. For example, the power meter 380 is a smart meter belonging to the power company 400.

Here, the power meter 380 transmits a message including an information element indicating a measurement result (the amount of tidal current or reverse tidal current (Wh)) per unit time to the local control apparatus 360 for each unit time (for example, 30 minutes). The power meter 380 may autonomously transmit a message, or may transmit the message according to the request of the local control apparatus 360.

The power company 400 is an entity that provides an infrastructure such as the power grid 110, and is, for example, a power operator such as a power generation operator or a power distribution operator. The power company 400 may entrust various tasks to the entity that manages the power management server 200.

(Power Management Server)

Figure 3:
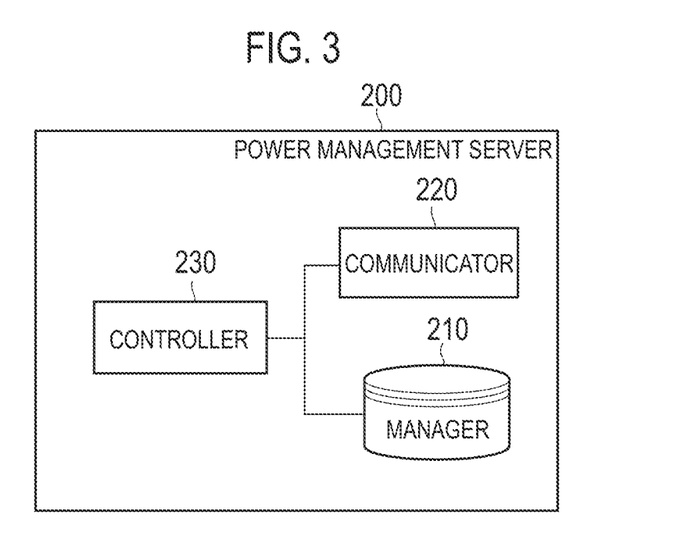
FIG. 3 is a diagram illustrating a power management server 200 according to an embodiment.

The power management server according to the embodiment will be described below. As illustrated in FIG. 3, the power management server 200 includes a management unit 210, a communication unit 220, and a controller 230. The power management server 200 is an example of a virtual top node (VTN).

The management unit 210 is constituted by a storage medium such as a non-volatile memory and/or an HDD, and manages data regarding the facility 300 managed by the power management server 200. The facility 300 managed by the power management server 200 may be the facility 300 having a contract with an entity that manages the power management server 200. For example, the data regarding the facility 300 may be the demand power supplied from the power grid 110 to the facility 300, and the power amount reduced by each facility 300 in response to a demand response (DR) of the demand power of the entire power grid 110. The data regarding the facility 300 may be the type of distributed power supply (solar cell apparatus 310, storage battery apparatus 320, or fuel cell apparatus 330) provided in the facility 300, specifications of the distributed power supply (solar cell apparatus 310, storage battery apparatus 320, or fuel cell apparatus 330) provided in the facility 300, and the like. The specifications may be rated generated power (W) of the solar cell apparatus 310, the maximum output power (W) of the storage battery apparatus 320, and maximum output power (W) of the fuel cell apparatus 330.

The communication unit 220 is constituted by a communication module, and communicates with the local control apparatus 360 via the network 120. The communication module may be a radio communication module conforming to standards such as IEEE802.11a/b/g/n, ZigBee, and Wi-SUN, or a wired communication module conforming to standards such as IEEE802.3. The communication unit 220 performs communication according to the first protocol as described above. For example, the communication unit 220 transmits the first message to the local control apparatus 360 according to the first protocol. The communication unit 220 receives the first message response from the local control apparatus 360 according to the first protocol.

In the embodiment, the communication unit 220 receives, from the facility 300 (for example, the local control apparatus 360 or the power meter 380), a message including the information element indicating the demand power supplied from the power grid 110 to the facility 300. The demand power may be the value measured by the power meter 380 described above. The demand power may be a value obtained by subtracting the output power of the distributed power supply (solar cell apparatus 310, storage battery apparatus 320, fuel cell apparatus 330) from the consumed power of the load equipment 340.

The controller 230 includes a memory, a CPU, and the like, and controls each component provided in the power management server 200. For example, the controller 230 transmits a control message to instruct the local control apparatus 360 provided in the facility 300 to control the distributed power supply (solar cell apparatus 310, storage battery apparatus 320, or fuel cell apparatus 330) provided in the facility 300. As described above, the control message may be a tidal current control message, a reverse tidal current control message, or a power supply control message.

(Local Control Apparatus)

Figure 4:
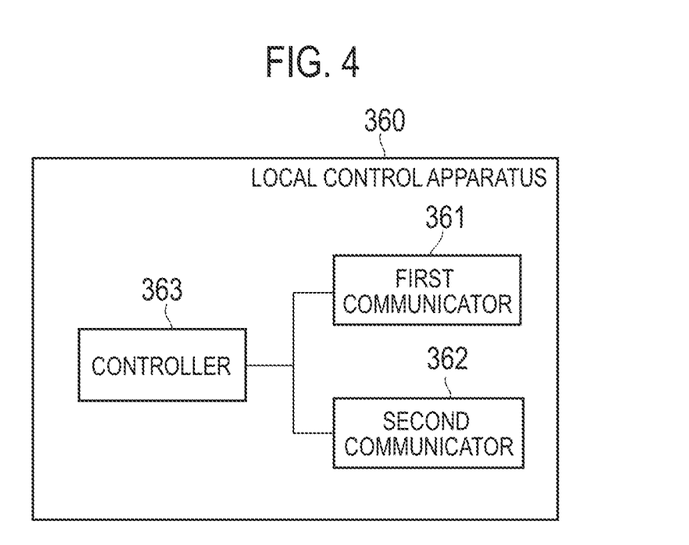
FIG. 4 is a diagram illustrating a local control apparatus 360 according to an embodiment.

The local control apparatus according to the embodiment will be described below. As illustrated in FIG. 4, the local control apparatus 360 includes a first communication unit 361, a second communication unit 362, and a controller 363. The local control apparatus 360 is an example of a virtual end node (VEN).

The first communication unit 361 is constituted by a communication module, and communicates with the power management server 200 via the network 120. The communication module may be a radio communication module conforming to standards such as IEEE802.11a/b/g/n, ZigBee, and Wi-SUN, or a wired communication module conforming to standards such as IEEE802.3. The first communication unit 361 performs communication according to the first protocol as described above. For example, the first communication unit 361 receives the first message from the power management server 200 according to the first protocol. The first communication unit 361 transmits a first message response to the power management server 200 according to the first protocol.

The second communication unit 362 is constituted by the communication module, and communicates with the distributed power supply (solar cell apparatus 310, storage battery apparatus 320, or fuel cell apparatus 330). The communication module may be a radio communication module conforming to standards such as IEEE802.11a/b/g/n, ZigBee, and Wi-SUN, or a wired communication module conforming to standards such as IEEE802.3. The second communication unit 362 performs communication according to the second protocol as described above. For example, the second communication unit 362 transmits the second message to the distributed power supply according to the second protocol. The second communication unit 362 receives the second message response from the distributed power supply according to the second protocol.

The controller 363 includes a memory, a CPU, and the like, and controls each component provided in the local control apparatus 360. Specifically, the controller 363 instructs an equipment to set the operating state of the distributed power supply by transmitting the second message and receiving the second message response in order to control the power of the facility 300. The controller 363 may instruct the distributed power supply to report information on the distributed power supply by transmitting the second message and receiving the second message response in order to manage the power of the facility 300.

(Application Scene)

An application scene of the embodiment will be described below. It is assumed that the power management server 200 receives the demand response of the demand power of the power grid 110 from the power company 400 which is an upper node of the power management server 200. In such a case, the power management server 200 only has to reduce, from the baseline power, the power amount equivalent to the contracted power amount of the entire facility 300 managed by the power management server 200.

The contracted power amount only has to be the power amount defined between the power management server 200 and the power company 400 in a negawatt power transaction. The baseline power is the demand power assumed when no demand response is made. The baseline power may be an average value of the demand power for a fixed period before a notice of activation of the demand response. The fixed period may be defined according to the substance of the negawatt power transaction, or may be defined between the power management server 200 and the power company 400.

In such a case, if the storage battery apparatus 320 is performing load-following processing, the baseline power may be zero, and if the baseline power is zero, the storage battery apparatus 320 may not meet the demand response. Therefore, it is preferable that the power management server 200 maintains a state in which the power amount corresponding to the contracted power amount is supplied to the facility 300. For example, in the case illustrated in FIG. 1, it is preferable that the total power amount supplied to facilities 300A to 300C is maintained at the power amount equivalent to the contracted power amount.

Under such a background, the power management server 200 includes a controller 230 that selects, from the plurality of facilities 300 having the storage battery apparatus 320, two or more first facilities to which the first processing for suppressing the discharge amount of the storage battery apparatus 320 is applied. In such a case, the controller 230 applies the same condition as a condition for suppressing the discharge amount of the storage battery apparatus 320 to two or more first facilities.

For example, the suppression condition only has to be a condition that fairness is secured between two or more first facilities. For example, the suppression condition may be defined by a suppression ratio of discharge power. The suppression ratio can be calculated by "1−(lowering DR shortage capacity/total planned discharge amount)".

The lowering DR shortage capacity is a value obtained by subtracting lowering DR reserved capacity from lowering DR required capacity. The lowering DR required capacity is the power amount that is to be supplied from the power grid 110 to the entire first facility. That is, the lowering DR required capacity is a capacity (hereinafter, also referred to as targeted reduction capacity) that is to meet the demand response as the entire first facility. The lowering DR reserved capacity is a capacity already reserved for the entire first facility, and is a value obtained by subtracting the total planned discharge amount from the total demand power amount. The total demand power amount is the total demand power amount of the first facility. The total planned discharge amount is the power amount planned to be discharged from the storage battery apparatus 320 of the entire first facility. The planned discharge amount of each first facility is defined based on the storage capacity or the remaining storage amount of the storage battery apparatus 320.

Further, the controller 230 may select, from the plurality of facilities 300, a second facility in which the remaining storage amount of the storage battery apparatus 320 is equal to or less than a predetermined threshold before the expiration timing of the control target period. In such a case, the controller 230 applies, to the second facility, the second processing that shifts, to a later timing on a time axis, a predetermined timing at which the remaining storage amount of the storage battery apparatus 320 is equal to or less than the predetermined threshold before the expiration timing of the control target period. For example, the predetermined threshold is zero. As described above, the control target period is a period in which the storage battery apparatus 320 is estimated to be discharged.

According to the second processing, since the discharge amount of the storage battery apparatus 320 is maintained for the entire control target period, it is possible to suppress a situation in which the merit of introducing the storage battery apparatus 320 is impaired. Here, from the viewpoint of maintaining a reducible capacity (that is, purchased power amount) of the second facility until the control target period expires, the predetermined timing may be shifted until the control target period expires.

In the case where the selection of the first facility and the second facility described above is performed, even if the controller 230 applies the second processing to the second facility, when the total reducible capacity of the second facility does not reach the targeted reduction capacity, the first facility to which the first processing is applied may be selected. The controller 230 may select, as the first facility, the facility 300 other than the second facility. By doing so, it possible to avoid an injustice in which the first processing and the second processing are applied in duplicate.

The controller 230 may perform a recalculation related to at least one of the first processing and the second processing for each fixed period during the control target period. The fixed period for performing the recalculation may be the same as the fixed period for calculating the planned discharge amount. For example, the fixed period for performing the recalculation is 30 minutes. Here, the recalculation related to the first processing includes at least one of the selection of the first facility and the setting of the suppression condition. The recalculation related to the second processing includes at least one of the selection of the second facility and the setting of the shift method of the predetermined timing.

(First Processing)

An example of the first processing according to the embodiment will be described below. As described above, the first processing is processing that suppresses the discharge amount of the storage battery apparatus 320 according to the suppression condition. Here, the case where the suppression ratio is used as the suppression condition will be described.

Figure 5:
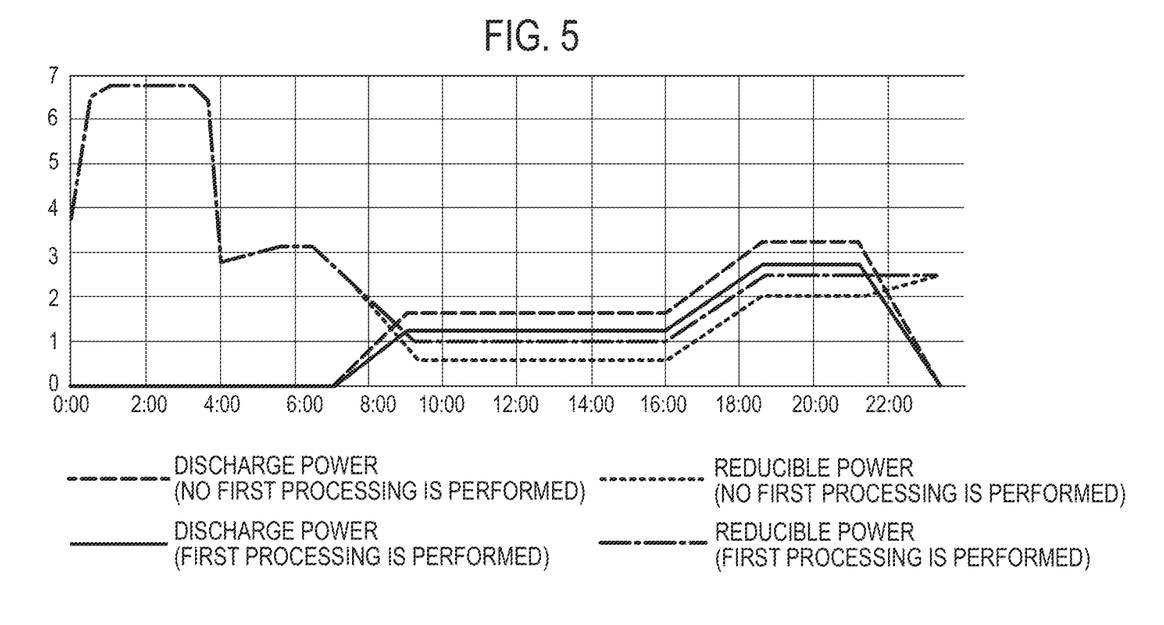
FIG. 5 is a diagram for explaining first processing according to an embodiment.

As illustrated in FIG. 5, in the case where the first processing is applied, the discharge power of the storage battery apparatus 320 is suppressed based on the suppression ratio, as compared with the case (for example, load-following processing) where the first processing is not applied. Therefore, in the case where the first processing is applied, the reducible power is increased as compared with the case where the first processing is not applied. That is, the reducible power is increased by suppressing the discharge power. For example, the reducible power is the power (purchased power) supplied from the power grid 110 to the facility 300.

(Second Processing)

Hereinafter, an example of the above-mentioned second processing will be described. As described above, the second processing is processing of shifting, to the later timing on the time axis, the predetermined timing at which the remaining storage amount of the storage battery apparatus 320 is equal to or less than the predetermined threshold before the expiration timing of the control target period. Here, the case where the predetermined threshold is zero will be described.

Figure 6:
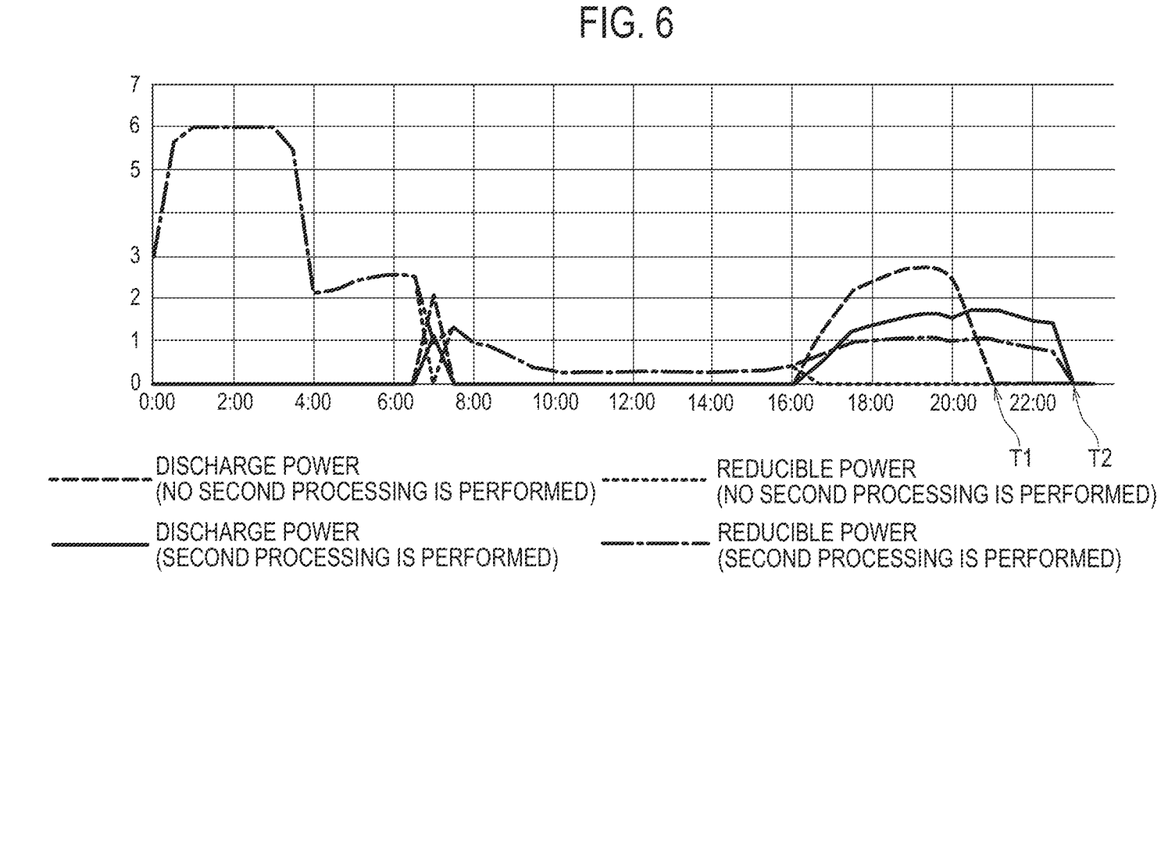
FIG. 6 is a diagram for explaining the first processing according to the embodiment.

As illustrated in FIG. 6, in the case (for example, load-following processing) where the second processing is not applied, the predetermined timing is T1, the entire consumed power of the facility 300 is covered by the discharge power of the storage battery apparatus 320 at a timing of 7:00 or a period after 17:00. Therefore, the reducible power is zero at the timing of 7:00 or the period after 17:00. On the other hand, in the case where the second processing is applied, the predetermined timing is shifted to T2, and the entire consumed power of the facility 300 is not covered by the discharge power of the storage battery apparatus 320 even at the timing of 7:00 or the period after 17:00, and the power is supplied from the power grid 110 to the facility 300. Therefore, the reducible power is secured even at the timing of 7:00 or the period after 17:00. That is, since the discharge amount of the storage battery apparatus 320 in the control target period is not decreased, it is possible to reduce the possibility that the reducible power becomes zero without impairing the merit (for example, the effect of reducing an electrical charge) of introducing the storage battery apparatus 320.

Here, when the second processing is not applied, since the storage battery apparatus 320 is discharged from 8:00 to 17:00, the remaining storage amount of the storage battery apparatus 320 is exhausted after 17:00, so the reducible capacity is zero. When the second processing is applied, the remaining storage amount of the storage battery apparatus 320 is exhausted after 23:00 (other than the control target period), so the reducible capacity is zero. When the second processing is applied, the power management server 200 may increase the reducible capacity by starting charging the storage battery apparatus 320 after 23:00. Similarly, when the second processing is not applied, the power management server 200 may increase the reducible capacity by starting charging the storage battery apparatus 320 after 23:00.

(Application Example of First Processing and Second Processing)

Hereinafter, application examples of the first processing and the second processing will be exemplified. Here, the case where the discharge plan of the storage battery apparatus 320 is set in units of the fixed period included in the control target period will be exemplified. The control target period is a period in which the storage battery apparatus 320 is estimated to be discharged. The control target period may be a period defined by a contract related to the negawatt power transaction, or may be a period in which the price of the power supplied from the power grid 110 is equal to or more than a threshold.

In a first step, the controller 230 calculates the demand power amount of the facility in the control target period based on a predicted value of the demand power amount of the facility.

In a second step, the controller 230 calculates the dischargeable amount of the facility in the control target period based on the storage capacity or the remaining storage amount of the storage battery apparatus 320.

In a third step, the controller 230 calculates a leveling coefficient for leveling the discharge amount of the storage battery apparatus 320 in the fixed period of two or more. The leveling coefficient is represented by the dischargeable amount/demand power amount.

In a fourth step, the controller 230 calculates the planned discharge amount of the facility for each fixed period. Specifically, the controller 230 calculates a value obtained by multiplying the demand power amount for each fixed period by the leveling coefficient as the planned discharge amount for each fixed period.

In a fifth step, the controller 230 calculates the lowering DR reserved capacity by subtracting the total planned discharge amount from the total demand power amount. The total demand power amount is the total demand power amount of the facility. The total planned discharge amount is the planned discharge amount of the entire facility.

In a sixth step, the controller 230 calculates the suppression ratio according to the equation {1−(lowering DR required amount−lowering DR reserved capacity)/total planned discharge amount}.

Seventh, the controller 230 corrects the planned discharge amount of each facility for each fixed period. Specifically, the controller 230 corrects the planned discharge amount by multiplying the planned discharge amount for each fixed period by the suppression ratio.

In the above-mentioned processing, the third to fifth steps are steps related to the above-mentioned second processing. In the above-mentioned processing, the sixth step is a step related to the above-mentioned first processing. Therefore, in the processing up to the fifth step, the sixth step may be omitted if the lowering DR reserved capacity is more than the lowering DR required amount.

(Power Management Method)

A power management method according to the embodiment will be described below. Here, the operation of the power management server 200 in the control target period will be described.

Figure 7:
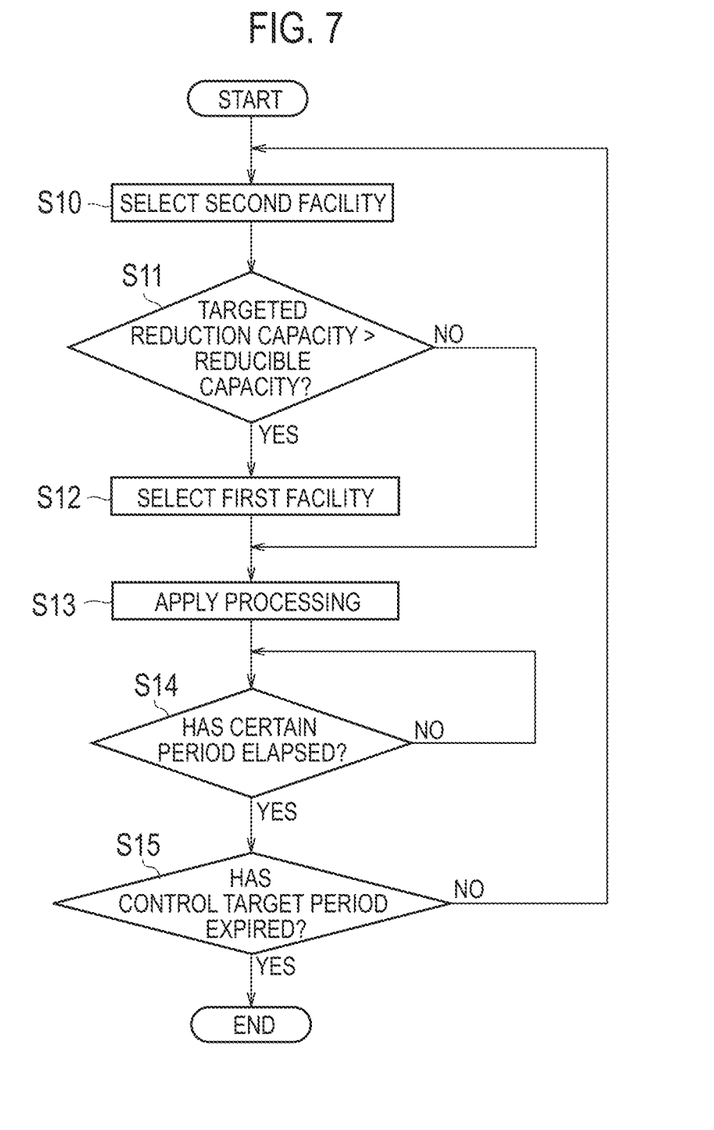
FIG. 7 is a diagram for explaining a power management method according to an embodiment.

As illustrated in FIG. 7, in step S10, the power management server 200 selects, from the plurality of facilities 300, the second facility in which the remaining storage amount of the storage battery apparatus 320 is equal to or less than the predetermined threshold before the expiration timing of the control target period.

In step S11, the power management server 200 determines whether the total reducible capacity of the second facility is smaller than the targeted reduction capacity when the second processing is applied to the second facility. If the determination result is YES, the power management server 200 performs the processing of step S12. If the determination result is NO, the power management server 200 performs the processing of step S13.

In step S12, the power management server 200 selects, from the plurality of facilities 300, the first facility to which the first processing that suppresses the discharge amount of the storage battery apparatus 320 is applied.

In step S13, the power management server 200 applies the second processing to the second facility. The power management server 200 applies the first processing to the first facility when the first facility is selected.

In step S14, the power management server 200 determines whether or not the fixed period has elapsed. If the determination result is YES, the power management server 200 performs the processing of step S15. When the determination result is NO, the power management server 200 waits.

In step S15, the power management server 200 determines whether or not the control target period has elapsed. If the determination result is YES, the power management server 200 ends a series of pieces of processing. If the determination result is NO, the power management server 200 returns to the processing of step S10.

In the example illustrated in FIG. 7, the operation of the power management server 200 in the control target period has been described, but the embodiment is not limited thereto. The selection of the first facility and the second facility may be performed before the control target period.

(Action and Effect)

In the embodiment, the power management server 200 applies the first processing to the first facility. With such a configuration, it is possible to secure the reducible capacity while ensuring the fairness between the two or more first facilities.

In the embodiment, the power management server 200 applies the second processing to the second facility. With such a configuration, it is possible to secure the reducible capacity while suppressing the situation in which the merit of introducing the storage battery apparatus 320 is impaired.

In the embodiment, the power management server 200 selects the first facility to which the first processing is applied in the case where the total reducible capacity of the second facility is smaller than the targeted reduction capacity when the second processing is applied to the second facility. Therefore, it is possible to fairly share the demerits of securing the reducible capacity among the facilities 300 while suppressing the situation where the merit of introducing the storage battery apparatus 320 is impaired as much as possible.

Other Examples

Although the present invention has been described with reference to the above-described embodiments, it should not be understood that the descriptions and drawings forming a part of this disclosure limit the present invention. From this disclosure, various alternative embodiments, examples, and operation techniques will be apparent to those skilled in the art.

In the embodiment, a solar cell apparatus 310 and a fuel cell apparatus 330 are provided. However, the embodiment is not limited thereto. As the distributed power supply, the solar cell apparatus 310 and the fuel cell apparatus 330 are not provided, and the storage battery apparatus 320 may be provided.

In the embodiment, the power management server 200 selects, as the first facility, the facility 300 other than the second facility. However, the embodiment is not limited thereto. The power management server 200 may select the facility 300 selected as the second facility as the first facility. Since the discharge amount of the storage battery apparatus 320 of the second facility is maintained for the entire control target period, the fairness between the facilities 300 is not significantly impaired.

In the embodiment, the case where the demand power of the facility 300 does not exceed the rated output of the storage battery apparatus 320 in the calculation of the lowering DR reserved capacity has been described. However, the embodiment is not limited thereto. When the demand power of the facility 300 exceeds the rated output of the storage battery apparatus 320, the lowering DR reserved capacity may be calculated within a range that does not exceed the rated output of the storage battery apparatus 320.

Although not particularly mentioned in the embodiment, the storage battery apparatus 320 may be a storage battery apparatus fixedly connected to a power line provided in the facility 300, or the storage battery apparatus 320 may be a storage battery apparatus detachably connected to the power line provided in the facility 300. As the storage battery apparatus detachably connected to the power line provided in the facility 300, the storage battery apparatus provided in an electric vehicle can be considered.

Although not particularly mentioned in the embodiment, the local control apparatus 360 provided in the facility 300 does not necessarily have to be provided in the facility 300. For example, some of the functions of the local control apparatus 360 may be provided by a cloud server provided on the Internet. That is, it may be considered that the local control apparatus 360 includes the cloud server.

In the embodiment, the case where the first protocol is a protocol conforming to Open ADR 2.0 and the second protocol is a protocol conforming to ECHONET Lite has been exemplified. However, the embodiment is not limited thereto. The first protocol only has to be a protocol standardized as a protocol used for communication between the power management server 200 and the local control apparatus 360. The second protocol only has to be a protocol standardized as a protocol used in the facility 300.

The entire contents of Japanese Patent Application No. 2017-236460 (filed on Dec. 8, 2017) are incorporated in the present specification by reference.

The invention claimed is:

1. A power management server, comprising:
a controller configured to
select two or more first facilities from among a plurality of facilities each having a storage battery apparatus;
after selecting the two or more first facilities, apply, to the two or more first facilities, first processing,
wherein
the first processing includes suppressing discharge of the storage battery apparatuses using a suppression ratio of discharge power amount, the suppression ratio being the same among the storage battery apparatuses of the two or more first facilities,
by the suppressing, a non-zero discharge power amount of the storage battery apparatuses is suppressed,
the controller is configured to
select, from the plurality of facilities, a second facility in which a remaining storage amount of the storage battery apparatus is equal to or less than a predetermined threshold before an expiration timing of a control target period, and
apply, to the second facility, second processing to shift a predetermined timing to a later timing on a time axis, the predetermined timing being a timing when the remaining storage amount of the storage battery apparatus is equal to or less than the predetermined threshold before the expiration timing of the control target period,
the controller is configured to select the two or more first facilities to which the first processing is applied in response to a total reducible capacity of the second facility not reaching a targeted reduction capacity even when the second processing is applied to the second facility, and
the controller is configured to select facilities other than the second facility as the first facilities.

2. The power management server according to claim 1, wherein the controller is configured to perform at least one of reselection of the first facilities or resetting of the suppression ratio for each certain period in the control target period.

3. The power management server according to claim 1, wherein the controller is configured to perform at least one of reselection of the second facility or resetting of a shift method of the predetermined timing for each certain period in the control target period.

4. The power management server according to claim 1, wherein the controller is configured to calculate the suppression ratio based on a total planned discharge power amount which is planned to be discharged from an entirety of the two or more first facilities.

5. A power management method, comprising:
selecting, from a plurality of facilities having storage battery apparatuses, two or more first facilities; and
after selecting the two or more first facilities, applying first processing to suppress discharge of the storage battery apparatuses using a suppression ratio of discharge power amount, the suppression ratio being the same among the storage battery apparatuses of the two or more first facilities,
wherein
by the suppressing, a non-zero discharge power amount of the storage battery apparatuses is suppressed,
the method further comprises
    selecting, from the plurality of facilities, a second facility in which a remaining storage amount of the storage battery apparatus is equal to or less than a predetermined threshold before an expiration timing of a control target period, and
    applying, to the second facility, second processing to shift a predetermined timing to a later timing on a time axis, the predetermined timing being a timing when the remaining storage amount of the storage battery apparatus is equal to or less than the predetermined threshold before the expiration timing of the control target period,
the two or more first facilities to which the first processing is applied are selected in response to a total reducible capacity of the second facility not reaching a targeted reduction capacity even when the second processing is applied to the second facility, and
facilities other than the second facility are selected as the first facilities.

* * * * *